APPARATUS FOR COMPUTING CORRELATION FUNCTIONS

Filed Aug. 11, 1949 4 Sheets-Sheet 1

Inventors
Yuk Wing Lee, Jerome B. Wiesner, & Thomas P. Cheatham, Jr.
by Kenway, Jenney, Witter & Hildreth attys.

June 30, 1953 YUK WING LEE ET AL 2,643,819

APPARATUS FOR COMPUTING CORRELATION FUNCTIONS

Filed Aug. 11, 1949 4 Sheets-Sheet 2

Inventors
Yuk Wing Lee, Jerome B. Wiesner
& Thomas P. Cheatham, Jr.
By Kenway, Jenney, Witter & Hildreth
Attys.

June 30, 1953 YUK WING LEE ET AL 2,643,819

APPARATUS FOR COMPUTING CORRELATION FUNCTIONS

Filed Aug. 11, 1949 4 Sheets-Sheet 3

Inventors
Yuk Wing Lee, Jerome B. Wiesner
& Thomas P. Cheatham, Jr.
by Kenway, Jenney, Witter
& Hildreth Attys.

Inventors
Yuk Wing Lee, Jerome B. Wiesner
+ Thomas P. Cheatham, Jr.
By Kenway, Jenney, Witter
+ Hildreth Attys.

Patented June 30, 1953

2,643,819

UNITED STATES PATENT OFFICE 2,643,819

APPARATUS FOR COMPUTING CORRELATION FUNCTIONS

Yuk Wing Lee and Jerome B. Wiesner, Belmont, and Thomas P. Cheatham, Jr., Marlboro, Mass., assignors, by mesne assignments, to Research Corporation, New York, N. Y., a corporation of New York Application August 11, 1949, Serial No. 109,786

9 Claims. (Cl. 235—61)

Figure 1:
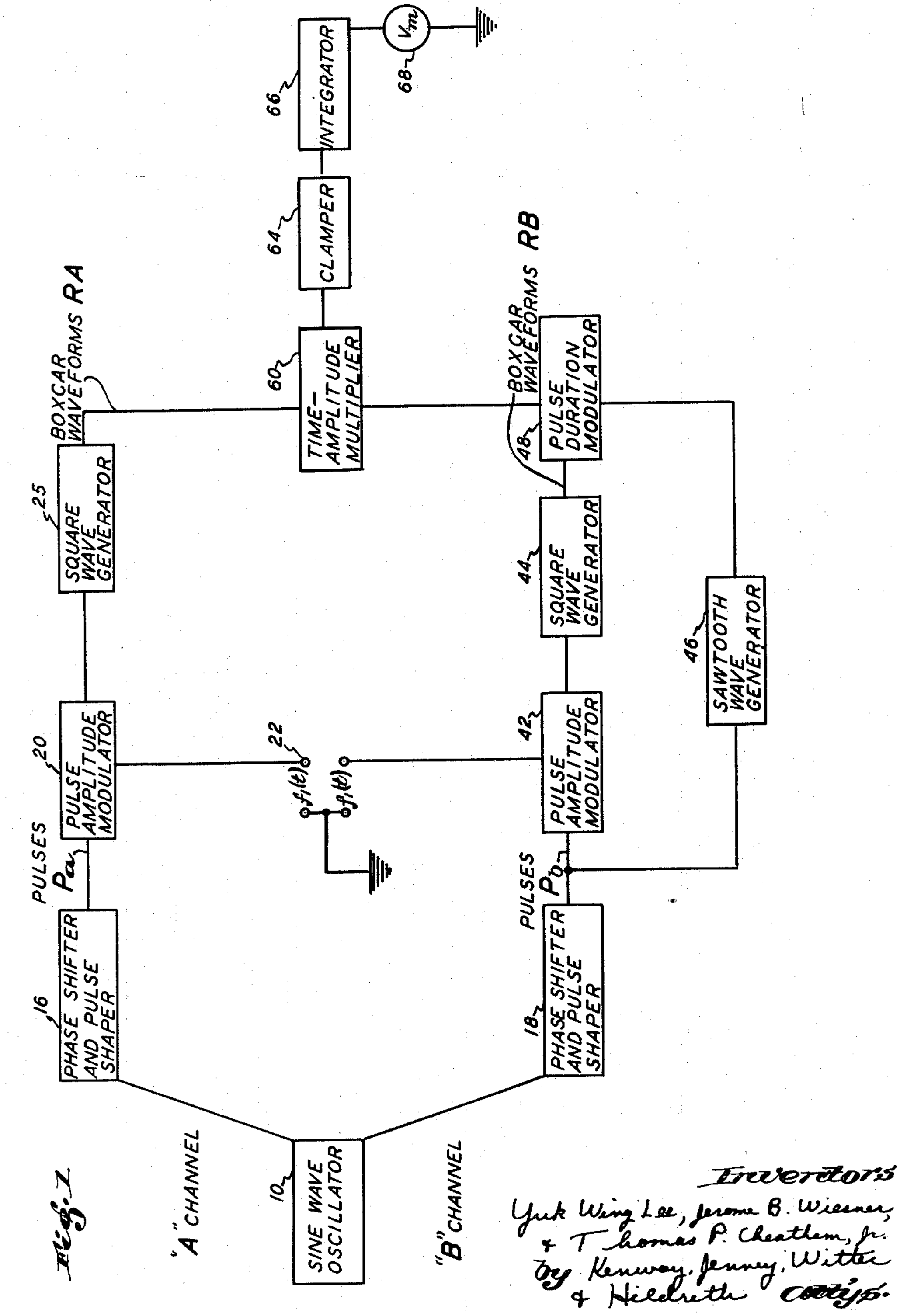

The present invention relates to computing methods and apparatus, and more particularly to methods and apparatus for computing correlation functions.

The functions with which the present invention is concerned are correlation functions of non-periodic time series. In general the correlation is represented by the following equation:

$$\phi_{fg}(\tau)=\lim_{T\to\infty}\frac{1}{2T}\int_{-T}^{T}f(t)\,g(t+\tau)\,dt$$

In the foregoing equation $f(t)$ and $g(t)$ may be any random non-periodic functions of time. In a specific form of the equation, $g(t)$ is identical with $f(t)$ so that the correlation function becomes the so-called auto-correlation which is as follows:

$$\phi_{ff}(\tau)=\lim_{T\to\infty}\frac{1}{2T}\int_{-T}^{T}f(t)\,f(t+\tau)\,dt$$

When the $f$- and $g$-functions are different the correlation is termed the cross-correlation. In any case the correlation is a function of $\tau$ since $t$ is eliminated by the integration.

The correlation functions are significant in any statistical analysis but their present importance lies primarily in the field of communications. The significance of the correlation functions in communications has been established by Wiener in "The Extrapolation and Interpolation of Stationary Time Series," NDRC Report, February 1, 1942 and in "Cybernetics," a publication of John Wiley & Co., 1948. The recognition that communications is a statistical process forms the basis for the development of theories of prediction, filtering and also more general theories relating to the transmission of information.

Without going into the substance of the theories, the following brief explanation may be offered to explain their application to communications.

Let $f(t)$ represent the actual variation of amplitude against time for a person's voice over a fairly long period of time, say five minutes. This function is non-periodic, and includes transients at random times; stated simply, the voice actually does not enunciate any significant quantity of sound in exactly the same way twice. However, the auto-correlation, as computed by the formula above, is remarkably uniform for all speech made by the same person under similar circumstances. In other words, while a person's speech is rarely, if ever, actually repetitive so far as the time function is concerned, the voice may be said to be uniform in a statistical sense. The same considerations apply to music, to radar pulses, nerve synapses, coded microwave pulses, and in fact to any means by which "information" is transmitted.

The use of the Wiener theory in designing filters, and in improving and studying the fundamental nature of information theory generally, requires the evaluation of correlation functions for many different types of inputs. While correlation functions can be evaluated analytically for uniform periodic inputs, these are not significant to the theory. The correlation functions for certain specified types of random inputs may also be evaluated analytically, but they are also of little value except for the explanation of the theory. Accordingly it is desirable to provide some experimental means for obtaining correlation data for more general types of inputs, such as those above-mentioned. It is the object of the present invention to provide a method and apparatus by which either or both of the above correlation functions may be readily evaluated for any types of time series.

The integrals which represent the correlation functions are of a special type, in that the integrand represents the product of two time functions separated in time by a delay $\tau$. For instance, it appears at first as if the auto-correlation could be computed by first multiplying $f(t)$ by the same function which has been passed through a delay network of suitable form, and then continuously integrating the product. Actually, this has been found to give rise to considerable difficulties from the practical viewpoint.

According to the present invention, with the above object in view, the method and apparatus involve a sampling technique whereby the correlation function is evaluated by making an arbitrary or random selection of a large number of pairs of points, on functions $f(t)$ and $g(t)$, the corresponding points of each pair being separated in time by $\tau$ seconds. The corresponding values of $f(t)$ and $g(t+\tau)$ are then multiplied together and summed up to give one point on the correlation curve. The sampling is carried out over a sufficiently long period of time to assure that statistical equilibrium has been reached. Similar operations are carried out for different values of $\tau$ until enough values are obtained to plot the correlation function.

Other features of the invention comprise certain features of construction and modes of operation hereinafter described and partially defined in the claims.

Figure 2:
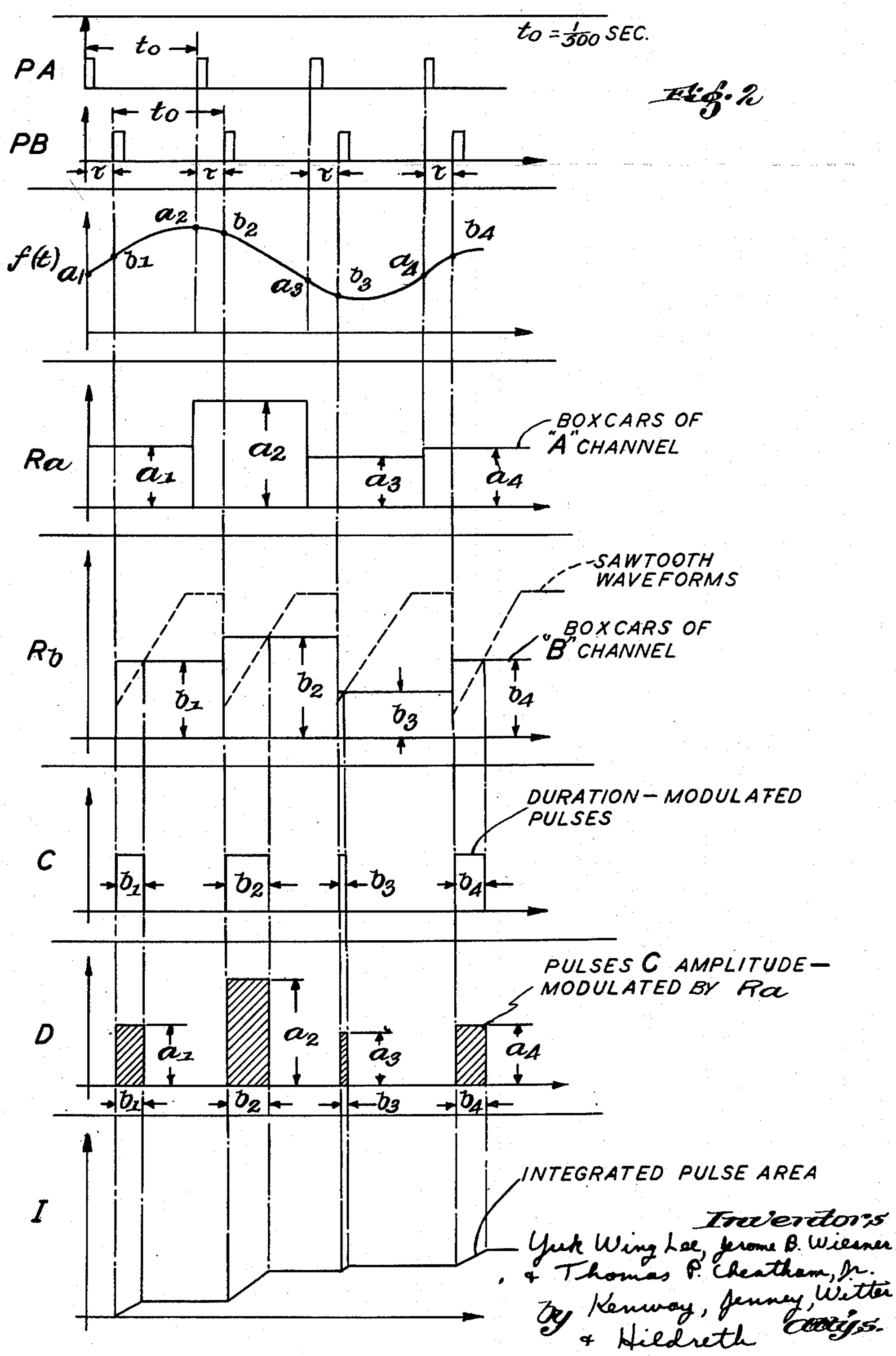
Figure 8:
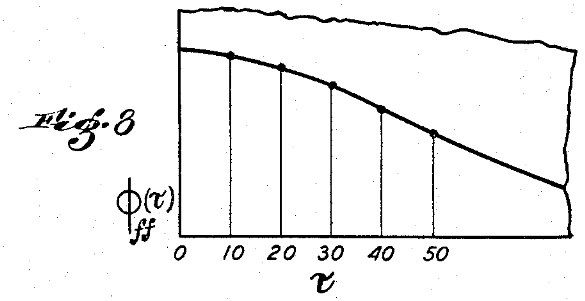

In the accompanying drawings Fig. 1 is a block diagram of the preferred form of apparatus according to the present invention; Fig. 2 is a chart of the characteristic waveforms at various points of Fig. 1; Figs. 3 to 7 inclusive are circuit diagrams of various units of Fig. 1; and Fig. 8 is a representative graph of the correlation function.

The following detailed description of the invention is given for the computation of an auto-correlation, although it will be understood that the invention is fully capable of computing cross-correlations.

A sample input time function, or time series as it may be termed, which is to be correlated is shown in Fig. 2 as $f(t)$. This series extends over a fairly long period of time, which may be taken as two minutes. The ordinates of the function are determined at various intervals which are designated by the values $a$. It is not essential that the values $a$ be uniformly spaced along the time axis so long as there is a sufficiently large number of them, over a sufficiently long period of time; but they are conveniently spaced uniformly for simplicity of equipment. By way of example, the several ordinates $a$ are spaced along the time axis by intervals $t_0$ of 1/500 of a second. Also, ordinates $b$ are shown in Fig. 2. These are likewise spaced along the time axis and each ordinate $b$ is separated from an associated $a$ ordinate by a definite "delay" time $\tau$. The time $\tau$ is fixed for the entire sampling operation and may be, say, 10 microseconds. As in the case of the $a$ ordinates, the $b$'s are not necessarily uniformly spaced with respect to each other, but each $b$ must be spaced from its associated $a$ by the exact time interval $\tau$. If, now, we take the product $ab$ for each pair, add all the products and average them over the full two-minute interval, we shall have a resultant which is proportional approximately to the auto-correlation $\phi_{11}(\tau)$ of the time series for the chosen value of $\tau$, namely 10$\mu$s. The same process is then repeated for another value or $\tau$, and so on, until enough points are obtained to give a smooth correlation curve. In making these computations as, for example in the case of a person's voice, the person may continue to speak into the input whereby for each value of $\tau$ computations are made over a two-minute period; or, if desired, a phonographic record may be taken and played repeatedly for each of the different values of $\tau$. The result is substantially the same in either case in view of the uniform statistical character of speech.

The precision of the operation may be estimated by established statistical methods. In the chosen example, wherein samples are taken every 1/500 of a second over a period of two minutes, there are 60,000 samples, and the correlation has been found to be correct within a few tenths of a percent. Actually, a smaller number of samples will suffice in many instances.

The method by which the operations are carried out involves the generation of two sets of pulses, the corresponding pulses of the two sets being spaced apart by the selected interval $\tau$. The means by which the pulses are generated and the time function is sampled may vary, and either analogue or digital methods of computation may be employed. The preferred form of the present invention described herein, involves the use of equipment whereby the $a$ and $b$ pulses are combined to form pulse trains in which the amplitude-duration products are proportional to the $ab$ products of the several pairs of ordinates. For this purpose the apparatus shown in the block diagram of Fig. 1 may be employed.

In Fig. 1 a sine wave oscillator 10 has its output directed into two channels A and B. A phase-shift and pulse shaping network 16 is provided in channel A and an identical network 18 is provided in channel B. The circuits 16 and 18 may be of any suitable form, as will be clear to those skilled in the art. The pulses in circuit 18 are separated from those in 16 by a time $\tau$ determined by the phase shifts introduced in the respective networks 16 and 18. Thus, with a 500 cycle oscillator and with positive and negative phase shifts up to 180° it is possible to obtain a time delay (value of $\tau$) from zero up to a maximum of 1/500 of a second. Referring to Fig. 2, the result of the foregoing operations is to produce two trains of pulses, indicated as PA for the A channel and PB for the B channel. As indicated for both channels, the pulses of each train are separated by a time equal to one period of the sine wave oscillator, which in the example chosen is 1/500 of a second, and is designated $t_0$ on the diagram. The second train PB of pulses is identical with the train PA but is displaced therefrom by the time $\tau$.

Figures 3, 4:
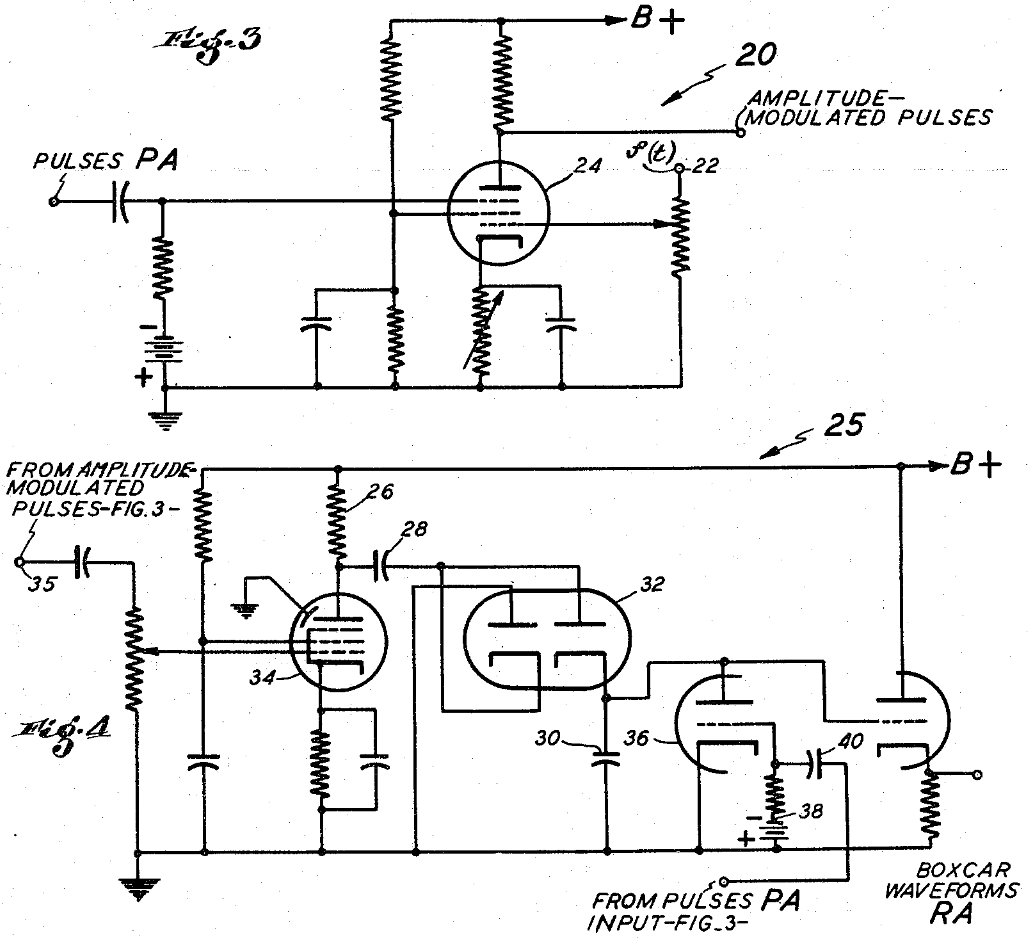
Figure 5:
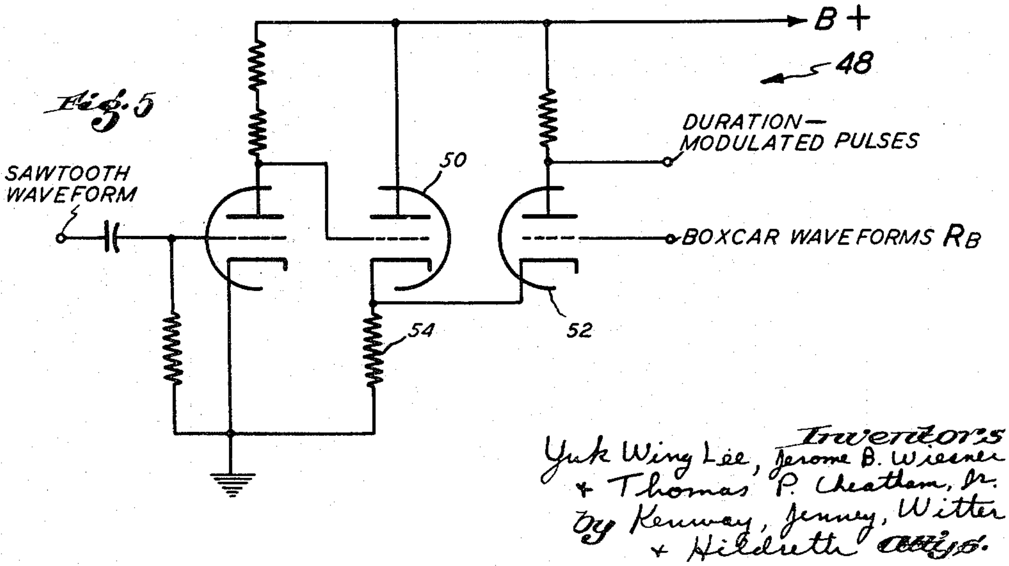
Figure 6:
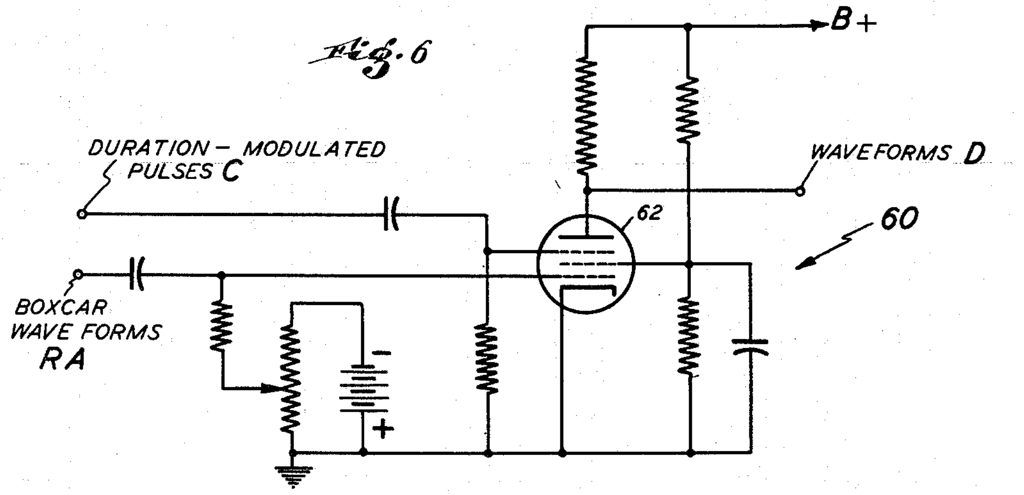
Figure 7:
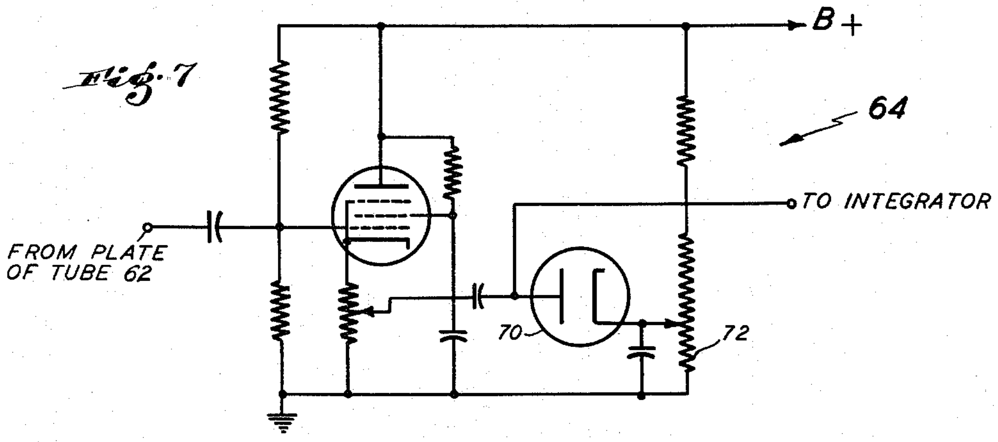

Referring to Fig. 1, the train PA of pulses is fed into a pulse amplitude modulator circuit 20 into which the function $f(t)$ is also introduced at 22. The circuit in its essential detail is shown in Fig. 3 and comprises a pentode 24 to which the function $f(t)$ is applied to the control grid, while the pulse train PA is applied to the suppressor grid. It will be understood that the term $f(t)$ is used to represent a voltage varying in time in accordance with the function $f(t)$ and may be the amplified output of a microphone or similar device. The result of the operation in the tube 24 is to provide a series of amplitude-modulated pulses. This series of amplitude-modulated pulses is fed to a square wave generator 25 which generates the rectangular waveforms or "boxcars" shown as RA in Fig. 2. The circuit of the square-wave generator is represented in Fig. 4. Resistor 26 and condensers 28 and 30 comprise a charging circuit operative when the right-hand section of a dual-diode 32 is conducting. Condenser 28 is large compared to 30 so that the circuit capacitance is substantially that of condenser 30. Condenser 28 is connected at its junction with resistor 26 to the plate of a pentode 34. The other side of condenser 28 is connected to the cathode of the left-hand section of dual-diode 32, and to the plate of the right-hand section. Pentode 34 receives its grid potential in the form of negative pulses from the amplitude-modulated pulses of Fig. 3, these negative pulses being introduced at 35. A triode 36 has its plate connected to one side of condenser 30, and its cathode connected to the other side, which is at ground. Resistor 38 and condenser 40 comprise a differentiating circuit receiving its input potential from a conveinent source of positive pulses PA and delivering its differentiated waveform to the control grid of triode 36.

For some finite period of time prior to the introduction of a pulse into the grid of pentode 34 the charging circuit will have time in which to charge up condensers 28 and 30 through the conduction of the right-hand section of dual-diode 32. Because of the relative sizes of the condensers, the voltage across 30 will become substantially that of the plate of pentode 34. Triode 36 is non-conducting at this time; so that the charging circuit will reach a state of equilibrium, with the sum of the voltages on condensers 28 and 30 equal to the plate potential of pentode 34.

A pulse PA is then transmitted through the differentiating circuit to the grid of triode 36, causing sufficient conduction to discharge the condenser 30. This will happen at a time corresponding to the front edge of both the pulse PA and the amplitude-modulated pulse. When the latter pulse enters the control grid of pentode 34, the plate voltage of the pentode will rise an amount determined by the amplitude of the input pulse. Condenser 30 then charges rapidly through the right-hand section of dual-diode 32 until its voltage is substantially equal to that from ground to the plate of pentode 34, at which time the diode section becomes non-conducting.

The above-mentioned charging of condenser 30 is complete by the time the input pulse has terminated. When this occurs, the plate of pentode 34 will again return to its former value. In doing so, it will not, however, cause the discharge of condenser 30 through the right-hand diode section. The quantity of charge which flows into condenser 30 during the charging period is a function of the amplitude of the initiating impulse. Hence, the voltage to which condenser 30 will rise is also a function of that amplitude. This voltage is assumed rapidly by condenser 30 and will remain until a new pulse is introduced to the grid of triode 36.

In the circuit of Fig. 4, therefore, the rectangular form of each boxcar is determined by the application of the B+ voltage to the charging circuit. The amplitude of the boxcar is determined by the amplitude of the pulses introduced at 35. Each boxcar is cut off by the wave front of the succeeding pulse PA introduced into the triode 36, whereby each boxcar is of a duration $t_0$. Therefore the boxcars are of uniform duration and of heights proportional to the ordinates $a$ of $f(t)$.

In the B channel the pulses PB are fed into a pulse amplitude modulator 42 and a square wave generator 44 identical with the circuits 20 and 25 heretofore described, whereby a set of boxcars RB is formed. In this channel the boxcars start at times separated from those of the train RA by a time $\tau$ and their amplitudes are proportional to the ordinates $b$ of $f(t)$.

It is now necessary to convert the boxcars RB into pulses of uniform amplitude but of durations proportional to the amplitudes $b$. This is accomplished by intersecting each boxcar with a saw-tooth pulse indicated as superposed on RB in dotted lines in Fig. 2. To this end the saw-tooth generator 46 of any conventional form applies saw-tooth variations of potential to the pulse duration modulation circuit 48 (Fig. 5) to which the boxcar waveforms from 44 are also introduced. The pulse duration modulation circuit comprises essentially a triode 50 and a triode 52 having a common cathode resistor 54. The saw-tooth potentials are applied to the grid of the tube 50 while the boxcar waveforms RB are applied to the grid of triode 52. The current in tube 52, and hence the plate voltage, is a function both of the voltage RB and of the voltage across cathode resistor 54. The boxcar pulse raises the resistor voltage, thus biasing tube 50 to cut-off. When tube 50 is below cut-off, and there is a boxcar waveform on the grid of tube 52, the voltage across resistor 54 will have a value dependent only on the boxcar voltage and the circuit and tube constants of tube 52. The saw-tooth voltage applied to the grid of tube 50 is thus seen to have no effect upon the resistor voltage until the saw-tooth voltage rises above the cut-off value of grid voltage for tube 50 (which depends on the resistor voltage which in turn depends on the boxcar amplitude $b$). When the grid voltage of tube 50 rises above cut-off the added conduction through resistor 54 will be reflected by a decrease in the plate voltage of tube 52. The result is that the boxcars are cut off in duration as indicated by pulses C in Fig. 2. The output from tube 52 consists of pulses dependent in duration on $b$ and of amplitude $b$. The pulses shown at C in Fig. 2 have been suitably shaped in conventional circuits to give pulses of constant amplitude, the durations varying, however, in accordance with the ordinates $b$.

The waveforms from both channels are now fed into the time-amplitude multiplying circuit 60 wherein the waveforms shown as D in Fig. 2 are obtained, namely waveforms in which the amplitudes are proportional to the ordinates $a$ and the durations are proportional to the ordinates $b$. The circuit 60 is shown in essential detail in Fig. 6 and comprises a pentode 62 to which the boxcars RA are applied to the control grid and the waveforms C are applied to the suppressor grid. The anode voltage of the tube 62 therefore comprises the waveforms D which are proportional in amplitude to the RA pulses and of durations determined by the suppressor potentials, namely the durations determined by the ordinates $b$.

The waveforms D are now fed through a clamper circuit 64 to be presently described, and thence to an integrator 66 which is conventionally shown as an RC integrating circuit. The integrating circuit may be of any suitable form but is preferably a Miller integrator whereby integrations over moderately long time intervals may be effected. A complete description of a Miller integrator will be found in Briggs, "The Miller Integrator," Electronic Engineering, vol. 20, pp. 243–247, 279–284, and 325–330, and also in Greenwood, Oldam and MacRae, Electronic Instruments, pp. 79–82, vol. 21 of Radiation Laboratory Series, McGraw-Hill, N. Y., 1948. It suffices to say here that a suitable integrator may be made by connecting a capacitor from the positive output terminal of an amplifier to the corresponding input terminal; the integrated output is read out of the output terminals. The integrator output is recorded on a meter 68 indicated diagrammatically as a voltmeter connected to ground. At the conclusion of the sampling period, which as heretofore stated may be of the order of two minutes, the integrated value of the correlation is read from the meter 68.

We now refer to the clamper circuit 64. It will be observed in Fig. 7 that the steady-state potential of the movable contact on the cathode resistor in the left-hand stage changes as the contact is moved to select various values of output voltage for the given tube amplification. The clamper circuit 64 is a compensating circuit which controls the mean level of the pulse train into the integrator and hence allows full-scale use of the voltmeter in any selected region of the correlation function. The clamper circuit comprises simply a diode 70 having its anode connected to the integrator input and its cathode connected to a positive source of D. C. potential represented by the potentiometer 72 by which the cathode potential may be varied. In order to determine the normal potentiometer setting it is only necessary to operate the system for a short time without any $f(t)$ input. The potentiometer is adjusted so that the integral will be zero.

The instantaneous integrated output which appears on the meter 68 is shown at I in Fig. 2. Since the correlation is an average over the entire sampling period, it is necessary to divide the integrated value I by the number of samples taken, corresponding to the division by 2T in the above equations. In practice, however, the apparatus is calibrated for a particular sampling period, say two minutes, whereby the value of the correlation for the chosen value of $\tau$ is obtained directly from the output meter reading.

The value of the auto-correlation thus obtained is for one value of $\tau$, say 10 microseconds. The same procedure is repeated for other values of $\tau$, and the results may be plotted as shown in Fig. 8, in which a representative curve of $\phi_{ff}(\tau)$ is shown. Any suitable recording devices may be used to plot the curve automatically.

Although the computation is of greatest utility for nonperiodic time functions to which the Wiener theory is particularly applicable, the method and apparatus of the present invention are equally suitable for the computation of correlations of periodic time functions; for example, since correlation functions of periodic time series are susceptible of analytic computation, they may be and have been used as a means of checking the operation of the apparatus.

Although the invention has been described for use in computing the auto-correlation function, it may also be used for cross-correlations, in which case $f(t)$ is introduced at one input and $g(t)$ at the other.

It will be understood that the principal feature of the invention resides in the computation of the correlation function by sampling with two trains of pulses separated by the delay $\tau$, and that while specific circuits for accomplishing this result have been shown and described, the invention in its broader aspects is not limited thereto.

Having thus described the invention, we claim:

1. Apparatus for computing correlation functions of time series comprising means for generating two pulse trains, means for delaying the pulses of one train with respect to the pulses of the other train by a selected delay time, modulating circuits to modulate both the delayed and undelayed pulses in accordance with instantaneous values of said time series, means for obtaining waveforms corresponding to products of the instantaneous values represented by said modulated pulses, and an integrating circuit for said waveforms, said integrated output being the value of the correlation function for the selected delay time.

2. Apparatus for computing correlation functions of time series comprising means for generating two pulse trains, means for delaying the pulses of one train with respect to the pulses of the other train by a definite delay time, a pulse amplitude modulator for one train, a pulse duration modulator for the other train, said modulators operating on the pulse trains in accordance with instantaneous values of the time series, a duration-amplitude multiplier for obtaining pulses of varying durations and amplitudes, and integrating means for said pulses.

3. Apparatus for computing correlation functions of time series comprising means for generating two pulse trains, means for delaying the pulses of one train with respect to the pulses of the other train by a definite delay time, a square wave generator for each train, a pulse amplitude modulator for one train of square waveforms, a pulse duration modulator for the other train, said modulators operating on the square waveforms in accordance with instantaneous values of the time series, a duration-amplitude multiplier for obtaining pulses of varying durations and amplitudes, and integrating means for said pulses.

4. Apparatus for computing correlation functions of time series comprising means for generating two pulse trains, means for delaying the pulses of one train with respect to the pulses of the other train by a definite delay time, a pulse amplitude modulator for each train, said modulators operating on the pulse trains in accordance with instantaneous values of the time series, a square wave generator for each train, said square wave generators producing waveforms of constant duration and amplitudes corresponding to the amplitudes of the said modulated pulses, means for producing pulses from one series of square waveforms varying in duration as the amplitudes of the square waves, a duration-amplitude multiplier for obtaining pulses of varying durations and amplitudes, and integrating means for said last-mentioned pulses.

5. Apparatus for computing correlation functions of time series comprising means for generating two pulse trains, means for delaying the pulses of one train with respect to the pulses of the other train by a definite delay time, a pulse amplitude modulator for each train, said modulators operating on the pulse trains in accordance with instantaneous values of the time series, a square wave generator for each train, said square wave generators producing waveforms of constant duration and amplitudes corresponding to the amplitudes of the said modulated pulses, a sawtooth wave generator producing sawtooth-shaped waveforms at the same frequency as the pulse trains, a pulse duration modulator to which both the saw-tooth wave form and one of the square wave forms are inputs, and whose output becomes zero when the sawtooth amplitude rises to a selected proportion of the square wave amplitude, whereby pulses are produced from the said sawtooth waveforms varying in duration as the amplitudes of one of the series of square waves, a duration-amplitude multiplier for obtaining pulses of varying durations and amplitudes and integrating means for said last-mentioned pulses.

6. Apparatus for computing correlation functions of time series comprising means for generating two pulse trains, means for delaying the pulses of one train with respect to the pulses of the other train by a definite delay time, a pulse amplitude modulator for each train, said modulators operating on the pulse trains in accordance with instantaneous values of the time series, a square wave generator for each train, said square wave generators producing waveforms of constant duration and amplitudes corresponding to the amplitudes of the said modulated pulses, a sawtooth wave generator producing sawtooth-shaped waveforms at the same frequency as the pulse trains, a pulse duration modulator to which both the saw-tooth wave form and one of the square wave forms are inputs, and whose output becomes zero when the sawtooth amplitude rises to a selected proportion of the square wave amplitude, whereby pulses are produced from the said sawtooth waveforms varying in duration as the amplitudes of one of the series of square waves, a duration-amplitude multiplier for obtaining pulses of varying durations according to the said duration-modulated pulses, and of varying amplitudes according to the other series of square waves, and integrating means for said amplitude- and duration-modulated pulses.

7. Apparatus for computing correlation functions of time series comprising means for generating two pulse trains, means for delaying the pulses of one train with respect to the pulses of the other train by a definite delay time, means for introducing the said time series superimposed on a constant value sufficient to prevent a change in the polarity of the input, a pulse amplitude modulator for each train, said modulators operating on the pulse trains in accordance with instantaneous values of the time series, a square wave generator for each train, said square wave generators producing waveforms of constant duration and amplitudes corresponding to the amplitudes of the said modulated pulses, means for producing from the output of one of the square wave generators, pulses varying in duration as the amplitudes of the square waves, a duration-amplitude multiplier for obtaining pulses of varying durations and amplitudes, and integrating means for said last-mentioned pulses and clamping means for clamping the input to the integrating circuit at a value to compensate for the said constant value introduced into the time series.

8. Apparatus for computing correlation functions of time series comprising means for generating two pulse trains, means for delaying the pulses of one train with respect to the pulses of the other train by a selected delay time, modulating circuits to modulate both the delayed and undelayed pulses in accordance with instantaneous values of said time series, means for obtaining waveforms corresponding to products of the instantaneous values represented by said modulated pulses, and an integrating circuit for said waveforms and clamping means for clamping the input of the integrating circuit at a value to compensate for the average value of the input to the computer, said integrated output being the value of the correlation function for the selected delay time.

9. Apparatus for computing correlation functions of time series comprising means for generating two pulse trains, means for delaying the pulses of one train with respect to the pulses of the other train by a selected delay time, pulse modulation circuits for both the delayed and undelayed trains, means for affecting said modulation circuits in accordance with said voltages corresponding to said time series plus a constant voltage, means for obtaining waveforms corresponding to products of the instantaneous values represented by said modulated pulses, an integrating circuit, and clamping means to eliminate from the integrating circuit the effects of said constant voltage, said integrated output being the value of the correlation function for the selected delay time.

YUK WING LEE.
JEROME B. WIESNER.
THOMAS P. CHEATHAM, Jr.

References Cited in the file of this patent

UNITED STATES PATENTS

| Number | Name | Date |
|---|---|---|
| 2,024,900 | Wiener | Dec. 17, 1935 |
| 2,124,599 | Wiener | July 26, 1938 |
| 2,128,257 | Yuk-Wing Lee et al. | Aug. 30, 1938 |
| 2,212,799 | Sperry | Aug 27, 1940 |
| 2,398,238 | McNatt | Apr. 9, 1946 |
| 2,415,191 | Rajchman | Feb. 4, 1947 |
| 2,435,496 | Guanella | Feb. 3, 1948 |
| 2,451,465 | Barney | Oct. 19, 1948 |
| 2,485,821 | Gloess | Oct. 25, 1949 |
| 2,520,125 | Clavier | Aug. 29, 1950 |
| 2,521,733 | Lesti | Sept. 12, 1950 |
| 2,525,496 | McCann | Oct. 10, 1950 |
| 2,539,623 | Heising | Jan. 30, 1951 |

OTHER REFERENCES

Radar Electronics Fundamentals Navships, 400,016, Bureau of Ships; Navy Dept., pages 172–177, July 5, 1946.